Dec. 12, 1933.  H. E. BRUNNER  1,939,618
MOUNTING CRANK SHAFT BEARING
Filed May 11, 1933  2 Sheets-Sheet 1
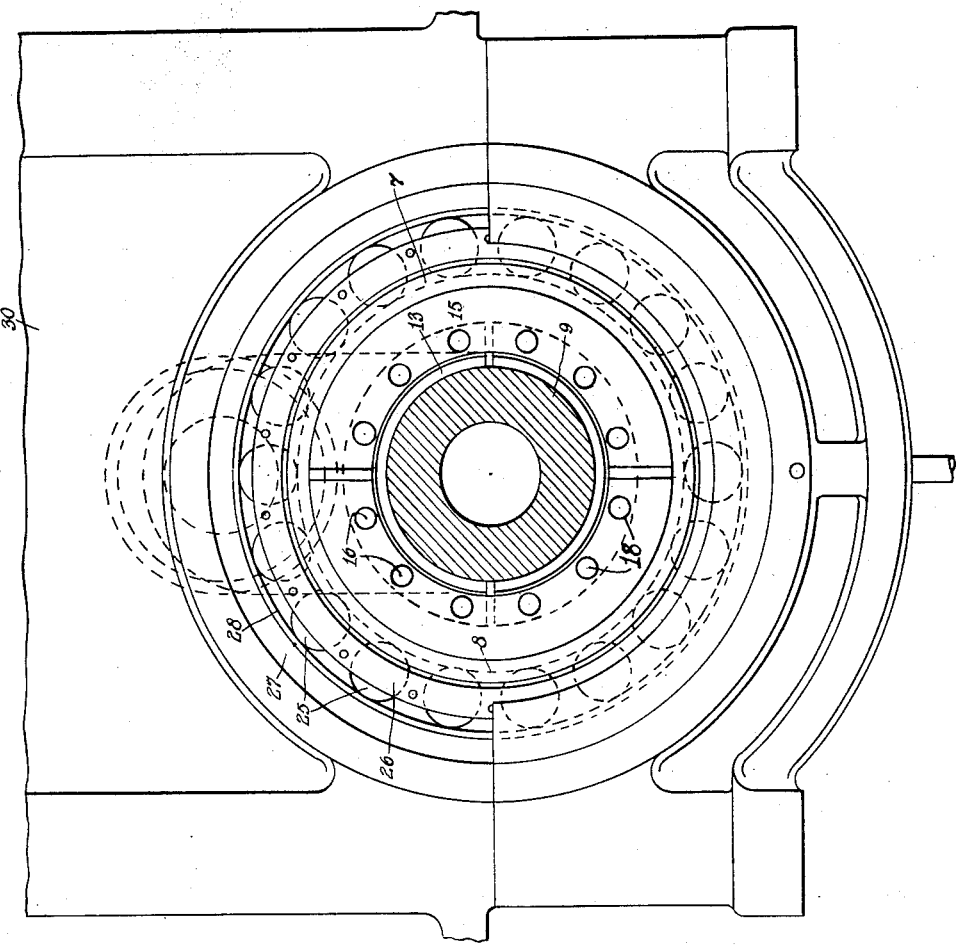
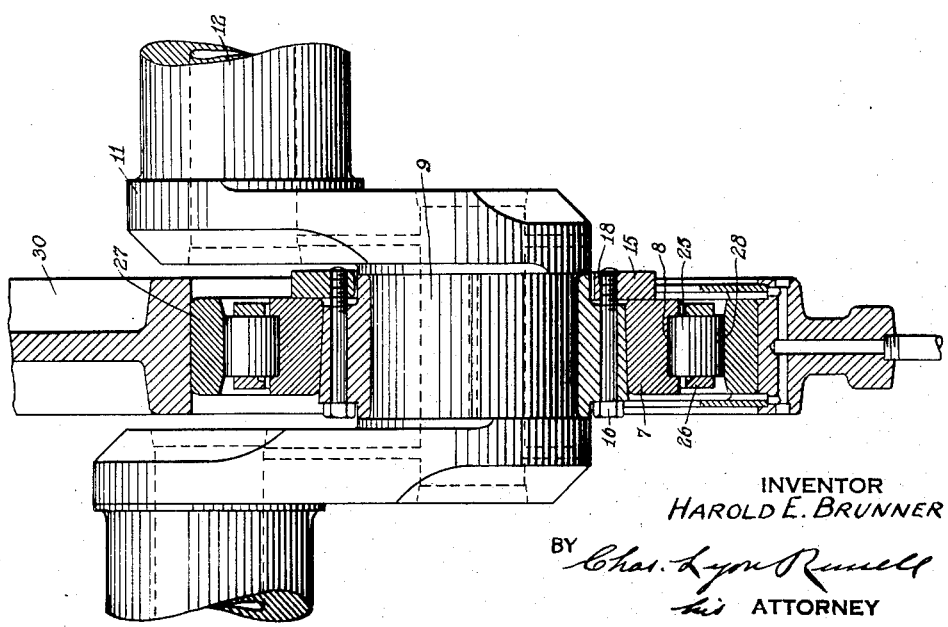
INVENTOR
HAROLD E. BRUNNER
BY Chas. Lyon Russell
his ATTORNEY Dec. 12, 1933.   H. E. BRUNNER   1,939,618
MOUNTING CRANK SHAFT BEARING
Filed May 11, 1933   2 Sheets-Sheet 2
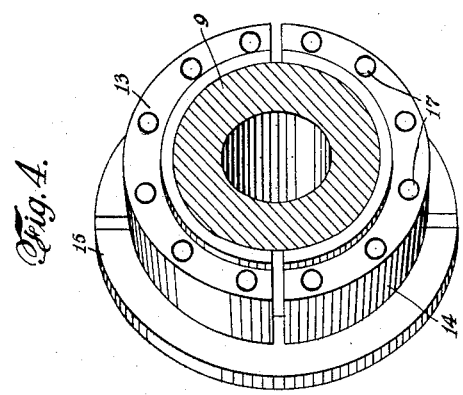
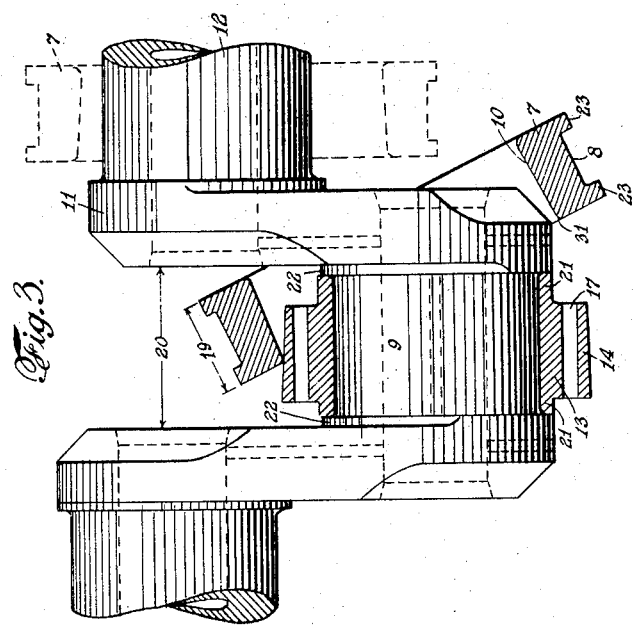
INVENTOR
HAROLD E. BRUNNER
BY
*his* ATTORNEY Patented Dec. 12, 1933

1,939,618

UNITED STATES PATENT OFFICE 1,939,618

MOUNTING CRANK-SHAFT BEARING

Harold E. Brunner, Larchmont, N. Y., assignor to The Hess-Bright Manufacturing Company, Philadelphia, Pa., a corporation of Delaware Application May 11, 1933. Serial No. 670,398

1 Claim. (Cl. 308—179)

This invention relates to the mounting of one piece bearing rings on one piece crankshafts.

Another object of the invention is the mounting of an anti-friction bearing comprising a one piece inner ring and a one piece outer ring upon a crankshaft and then assemblying the rolling elements between these parts.

Another object of the invention is to provide a split sleeve for insertion within a one piece bearing ring and means for clamping the sleeve to a crankshaft and to the bearing ring.

In the drawings accompanying this specification one practicable embodiment of my invention is illustrated, in which drawings Figure 1 is an elevation of a bearing portion of a crankshaft, a pair of crank cheeks and two broken away crank pins.

Fig. 2 is an end view of the device illustrated in Fig. 1 looking at this from the right hand side.

Fig. 3 illustrates the crankshaft parts shown in Fig. 1 and represents the manner of assemblying the bearing or threading this over the cheeks of the crankshaft and onto a sleeve surrounding the bearing portion of the shaft, and Fig. 4 is a detail in perspective showing some of the parts represented in Fig. 3.

The problem which this invention is designed to solve is the mounting of a one piece anti-friction bearing inner race ring such as 7 having an uninterrupted race groove 8 upon the bearing portion or pin 9 of a one piece crankshaft. While it is easy enough to select a bearing having an inner ring large enough to afford a bore 10 of sufficient size to pass over one of the cheek pieces such as 11 which connects one of the bearing portions 9 of the shaft with the crankpins 12, great difficulty has been experienced in high speed internal combustion engines in locking the ring 7 to the bearing seat formed on the crankshaft 9, particularly against radial movement. For this purpose I provide a split sleeve 13, somewhat of the adapter sleeve type, having a tapering outer bearing seat 14 to fit the bore 10 of the inner ring 7 of the bearing, which bore is preferably correspondingly tapered. Associated with this split sleeve is a split or two-piece locking ring 15 and a number of hexagonal cap screws 16 adapted to pass through suitable openings 17 in the sleeve members and be received by tapped or screw threaded holes 18 in the locking ring members 15. In a form of the invention which I have found to work satisfactorily in practice, twelve cap screws and screw openings are provided, that is, six openings 17 in each of the halves of the sleeve 13 and six tapped holes 18 in each of the halves of the ring 15, twelve being the most convenient number of holes for a quartering construction. Of course, one could have eight holes but twelve appears to look right.

In practice the length of the bearing ring 7 which is represented at 19 in Fig. 3 is considerably less than the length of the space between the cheek pieces represented at 20 in the same figure. The dimensions of the crankshaft are in accordance with a shaft designed for an internal combustion engine and the dimensions of the anti-friction bearing are in accordance with standard practice for a bearing intended to carry the loads of such a crankshaft. A portion of the sleeve 13 carrying the tapering face 14 is approximately the length of the tapering portion 10 of the bore of the ring 7. The sleeve inwardly of the portion which carries the screw receiving openings 17 is considerably lengthened as at 21—21 for the purpose of completely filling the space between the hubs 22 of the cheek pieces.

The anti-friction bearing illustrated is a cylindrical roller bearing, the groove 8 having lands or flanges 23 at its sides for limiting the longitudinal movement of the cylindrical rollers 25. The rollers in the illustration are shown mounted in a cage 26. The outer race ring 27 of the bearing is formed with a cylindrical face 28 constituting the raceway. The ring 27 is shown chamfered at the ends of its raceway 28. This outer race ring in Fig. 1 is shown mounted in the eye of a hanger 30.

The device is assembled substantially in the manner shown in Fig. 3. The split sleeve 13 is placed upon the crankshaft 9 and held in position by the fingers of the operator. The bearing ring 7 is then threaded over the crankshaft, the diagram of this being shown in Fig. 3, the dotted line position showing the ring after it has arrived at one of the pins or bearings 12. The ring is then turned into an oblique position to pass over the cheek piece 11 until its corner, which is generally formed on a radius as 31, comes in engagement with the face 14 of the split sleeve. The ring is then moved into such position that the entire circumference of the tapering face 14 is entered into the bore 10. The bearing is then slipped toward the left end of Fig. 3 illustration as far as may be by hand. The halves of the locking ring 15 are then placed at the end of the ring 7, the joints preferably quartering with the joints in the split sleeve. The cap screws are then passed through the openings 17 and into the tapped holes in the rings 15 by application of a wrench. The cap screws are then screwed up tightly drawing the locking ring against the end of the bearing inner ring 7 and forcing this up on the tapering face 14. When the cap screws are being inserted in the holes in the split sleeve and into the holes of the split locking ring they will be only partially tightened and the sleeve turned around so that the operator may work at the ends of the cheek pieces which will be at the lower part of the device illustrated in Fig. 1 and Fig. 3. The locking ring 15 is adapted to radially extend beyond the meeting faces of the bore of the bearing and the perimeter of the sleeve 13.

Having thus described my invention I claim and desire to secure by Letters Patent:

The combination with a crankshaft having a bearing portion, a pair of cheeks at the ends of the bearing portion and crank pins carried by the cheeks, of an anti-friction bearing including an inner race ring having a taper bore, it being large enough in diameter to be threaded over the cheeks, and a two piece split sleeve constructed and adapted to seat upon the said bearing portion and having a taper face adapted to enter the said taper bore and afford a seat for the said race ring, a two piece split locking ring located at the end of the bearing inner ring and the end of the sleeve having the small ends of the respective tapers, the locking ring extending radially inwardly and outwardly of the zone of meeting of the said tapers, and having longitudinal bolt openings in the sleeve and mating tapped openings in the locking ring and cap screws carried thereby for drawing the locking ring against the end of the bearing inner ring, the pieces of the sleeve and locking ring being mounted in such relative positions that the splits are quartering, the inner ring of the bearing having a raceway formed on its perimeter, the ring at each side of the raceway having a radially extending flange, a set of cylindrical rollers mounted on the raceway between the flanges, and an outer bearing ring having a raceway formed on its inner perimeter, the ring being formed open and without any land or radially extending shoulder at at least one side of the raceway.

HAROLD E. BRUNNER.